United States Patent
Yamauchi et al.

(10) Patent No.: US 10,593,114 B2
(45) Date of Patent: Mar. 17, 2020

(54) INFORMATION PROCESSING SYSTEM

(71) Applicant: FUJI XEROX CO., LTD., Tokyo (JP)

(72) Inventors: Akihito Yamauchi, Kanagawa (JP);
Yoshihiko Nemoto, Kanagawa (JP);
Tsutomu Kimura, Kanagawa (JP);
Masahiro Sato, Kanagawa (JP); Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/486,610

(22) Filed: Apr. 13, 2017

(65) Prior Publication Data

US 2018/0130258 A1   May 10, 2018

(30) Foreign Application Priority Data

Nov. 8, 2016   (JP) .................................. 2016-218417

(51) Int. Cl.
| | |
|---|---|
| *G06T 19/00* | (2011.01) |
| *G06T 11/00* | (2006.01) |
| *G06K 9/00* | (2006.01) |
| *G06T 11/60* | (2006.01) |

(52) U.S. Cl.
CPC ........ *G06T 19/006* (2013.01); *G06K 9/00671* (2013.01); *G06T 11/00* (2013.01); *G06T 11/60* (2013.01)

(58) Field of Classification Search
None
See application file for complete search history.

(56) References Cited

U.S. PATENT DOCUMENTS

| | | | | | |
|---|---|---|---|---|---|
| 5,625,765 | A | * | 4/1997 | Ellenby | G06T 3/4053 345/633 |
| 6,166,744 | A | * | 12/2000 | Jaszlics | G06T 17/00 345/421 |
| 6,549,660 | B1 | * | 4/2003 | Lipson | G06K 9/6255 382/224 |
| 6,604,049 | B2 | * | 8/2003 | Yokota | G01C 21/20 340/988 |
| 7,301,547 | B2 | * | 11/2007 | Martins | G06T 19/00 345/419 |
| 7,391,424 | B2 | * | 6/2008 | Lonsing | G06T 15/00 345/633 |
| 7,479,967 | B2 | * | 1/2009 | Bachelder | G06T 19/003 345/592 |
| 7,764,293 | B2 | * | 7/2010 | Kakuta | G06T 11/00 345/619 |
| 8,189,864 | B2 | * | 5/2012 | Kojo | G06K 9/00342 345/629 |

(Continued)

FOREIGN PATENT DOCUMENTS

JP    2002-169980 A    6/2002

*Primary Examiner* — Motilewa Good Johnson
(74) *Attorney, Agent, or Firm* — Oliff PLC

(57) ABSTRACT

An information processing system includes an attribute-information acquisition unit and an identification unit. The attribute-information acquisition unit acquires an attribute of an object that is present in a real space in accordance with information regarding the object an object image of which is captured. The identification unit identifies an image that is a virtual image associated with the attribute acquired by the attribute-information acquisition unit, the image being to be combined with the object image.

7 Claims, 15 Drawing Sheets

(56) References Cited

U.S. PATENT DOCUMENTS

| | | | | |
|---|---|---|---|---|
| 8,850,337 B2* | 9/2014 | Ooi | | G06T 19/006 715/762 |
| 8,902,227 B2* | 12/2014 | Harrison | | G06T 19/006 345/420 |
| 8,913,831 B2* | 12/2014 | Bergman | | G06T 7/11 382/173 |
| 9,014,414 B2* | 4/2015 | Katano | | G06T 19/006 345/419 |
| 9,129,404 B1* | 9/2015 | Wagner | | G06T 11/00 |
| 9,240,077 B1* | 1/2016 | Kraft | | G06T 19/006 |
| 9,600,935 B2* | 3/2017 | Cohen | | A63F 13/10 |
| 9,715,764 B2* | 7/2017 | Alaniz | | G06T 19/006 |
| 9,761,049 B2* | 9/2017 | Naegle | | G06T 19/006 |
| 9,912,874 B2* | 3/2018 | Kraft | | H04N 5/23293 |
| 10,043,315 B2* | 8/2018 | Meier | | G06T 15/20 |
| 2001/0013869 A1* | 8/2001 | Nozawa | | G06T 13/80 345/473 |
| 2002/0075286 A1* | 6/2002 | Yonezawa | | H04N 13/398 345/679 |
| 2003/0179218 A1* | 9/2003 | Martins | | G06T 19/00 345/633 |
| 2004/0208372 A1* | 10/2004 | Boncyk | | G06F 17/30256 382/181 |
| 2006/0181605 A1* | 8/2006 | Boncyk | | G06F 17/30256 348/14.01 |
| 2009/0096808 A1* | 4/2009 | Winn | | G06T 11/60 345/594 |
| 2010/0199166 A1* | 8/2010 | Fisk, III | | G06F 16/4393 715/230 |
| 2012/0069051 A1* | 3/2012 | Hagbi | | G06T 19/006 345/633 |
| 2012/0176410 A1* | 7/2012 | Meier | | G06F 3/011 345/633 |
| 2013/0278633 A1* | 10/2013 | Ahn | | G06T 19/006 345/633 |
| 2014/0063063 A1* | 3/2014 | Scott | | G06T 11/60 345/633 |
| 2014/0132632 A1* | 5/2014 | Cohen | | A63F 13/10 345/633 |
| 2016/0189397 A1* | 6/2016 | Mullins | | G06T 7/90 345/633 |
| 2016/0343173 A1* | 11/2016 | Mullins | | G06F 3/011 |
| 2017/0085964 A1* | 3/2017 | Chen | | H04N 21/816 |
| 2017/0109929 A1* | 4/2017 | Meier | | G06T 19/006 |
| 2018/0004286 A1* | 1/2018 | Chen | | G02B 27/017 |

* cited by examiner

FIG. 4
| ATTRIBUTE | VIRTUAL DATA IMAGE |||||
|---|---|---|---|---|---|
| SKY | 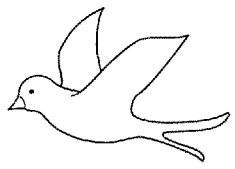 | BIRD | | | |
| MOUNTAIN | 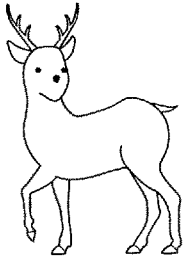 | DEER | | | |
| SEA | 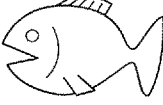 | FISH | 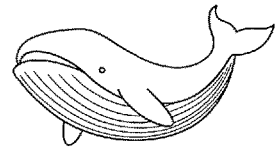 | WHALE | |
| ⋮ | ⋮ | | ⋮ | | |

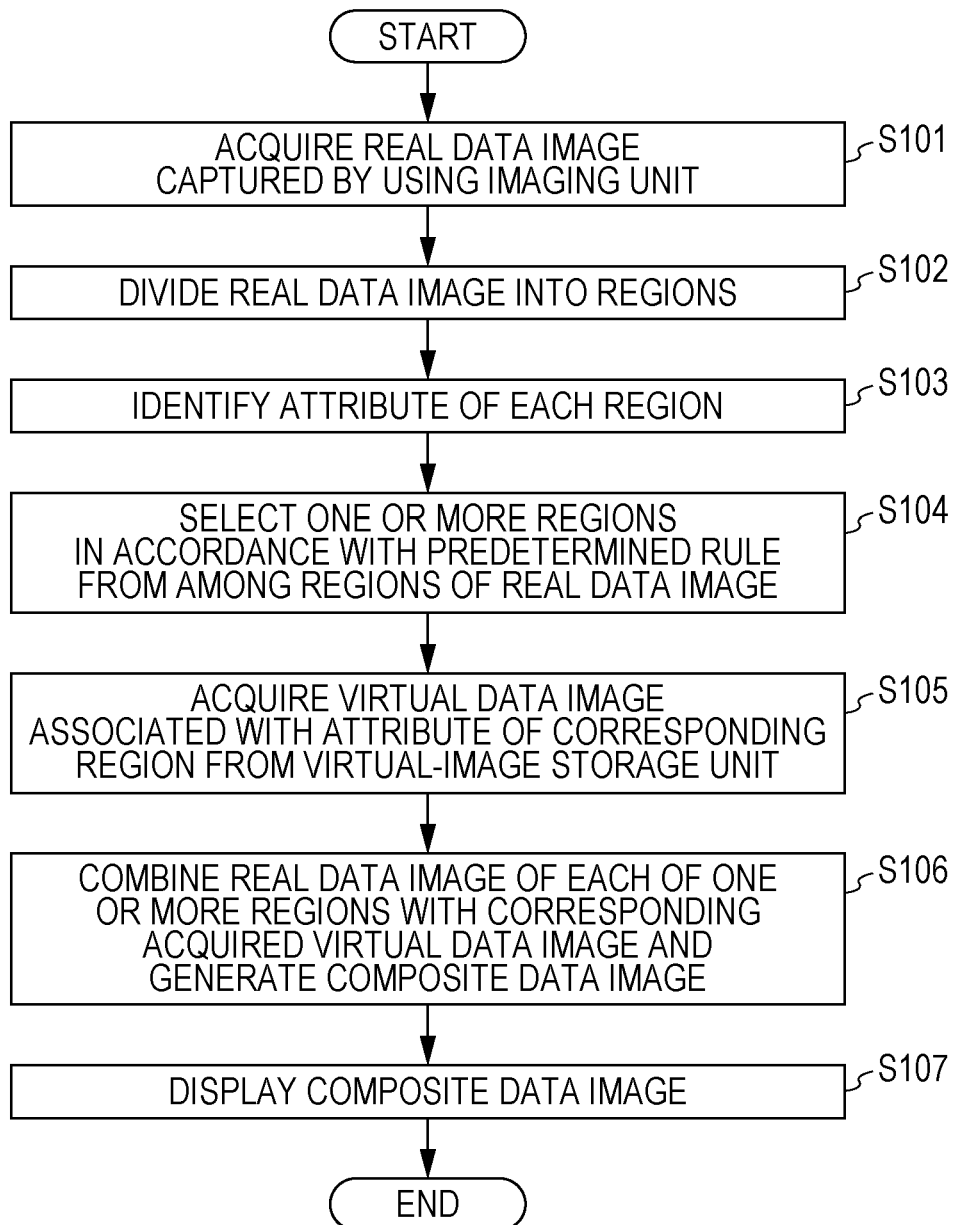

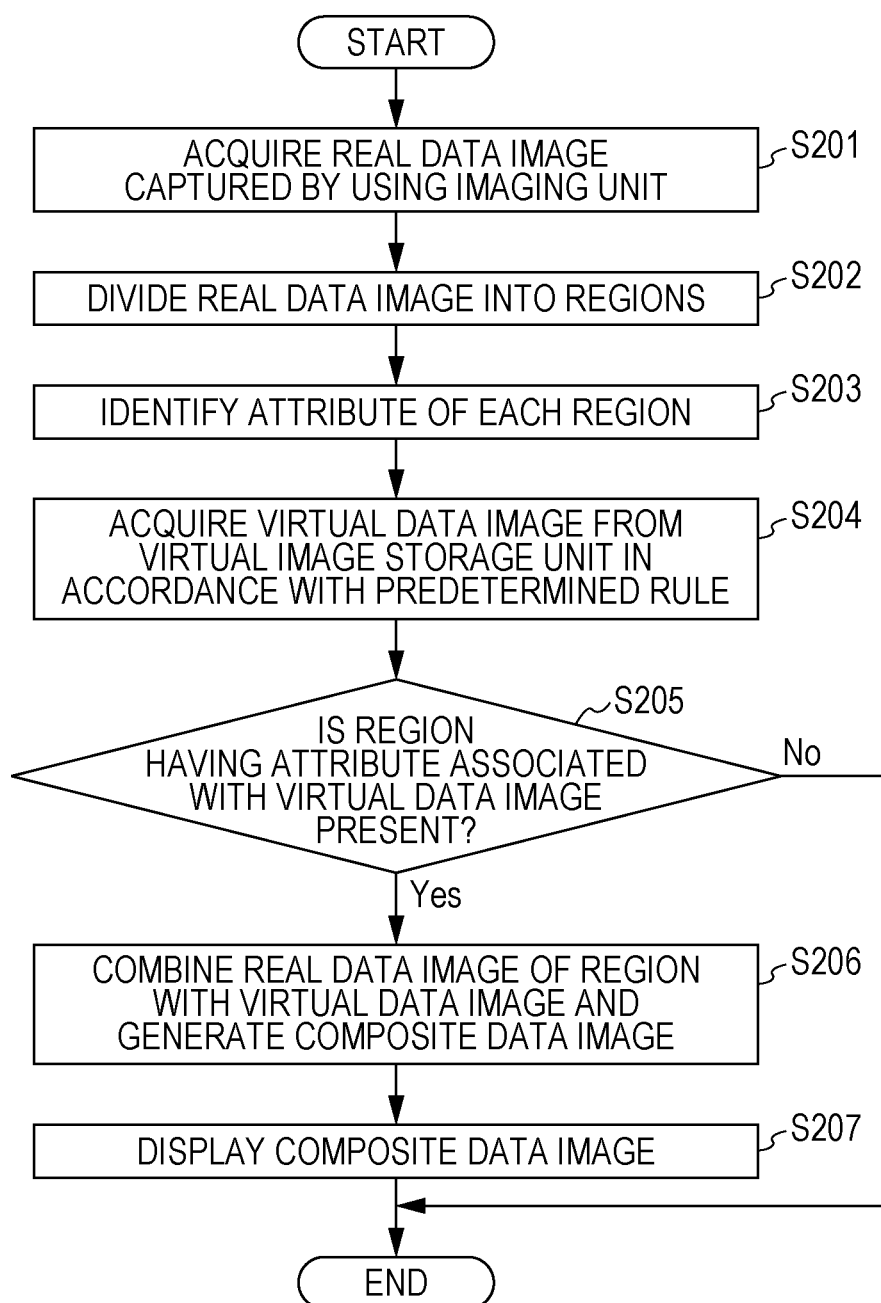

FIG. 9
| OBJECT ATTRIBUTE | CAPTURED DATA IMAGE | VIRTUAL DATA IMAGE |
|---|---|---|
| MUFFLER FROM COMPANY A |  | 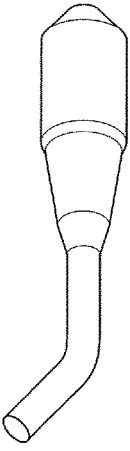 |
| MUFFLER FROM COMPANY B | 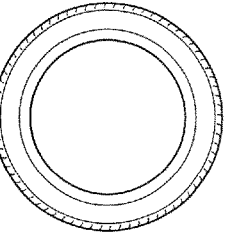 | 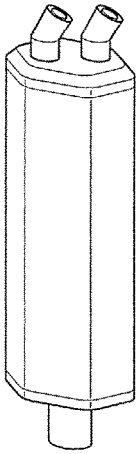 |
| TIRE FROM COMPANY C | 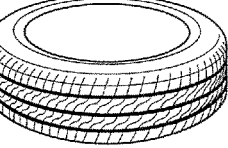 | |
| ... | ... | ... |

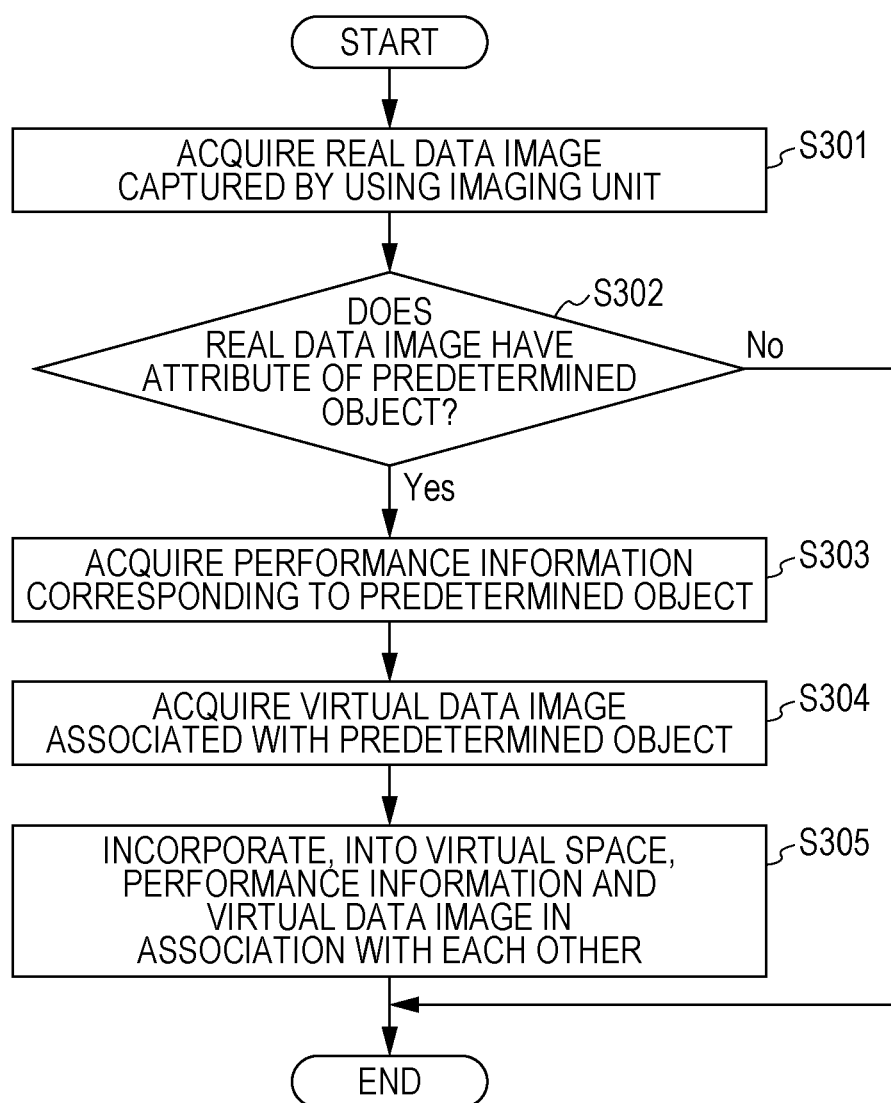

FIG. 13
| OBJECT ATTRIBUTE | SOUND | VIRTUAL DATA IMAGE |
|---|---|---|
| AUTOMOBILE FROM COMPANY A | ENGINE SOUND DOOR CLOSING SOUND | 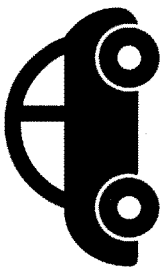 |
| AUTOMOBILE FROM COMPANY B | ENGINE SOUND DOOR CLOSING SOUND | 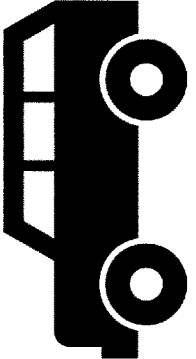 |
| AUTOMOBILE FROM COMPANY C | ENGINE SOUND DOOR CLOSING SOUND | 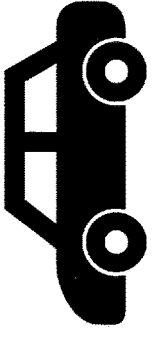 |
| ... | ... | ... |

INFORMATION PROCESSING SYSTEM

CROSS-REFERENCE TO RELATED APPLICATIONS

This application is based on and claims priority under 35 USC 119 from Japanese Patent Application No. 2016-218417 filed Nov. 8, 2016.

BACKGROUND

Technical Field

The present invention relates to information processing systems.

SUMMARY

According to an aspect of the invention, there is provided an information processing system including an attribute-information acquisition unit and an identification unit. The attribute-information acquisition unit acquires an attribute of an object that is present in a real space in accordance with information regarding the object an object image of which is captured. The identification unit identifies an image that is a virtual image associated with the attribute acquired by the attribute-information acquisition unit, the image being to be combined with the object image.

BRIEF DESCRIPTION OF THE DRAWINGS

Exemplary embodiments of the present invention will be described in detail based on the following figures, wherein:

FIG. 4 is a table illustrating an example of a virtual-image database (DB) according to Exemplary Embodiment 1;

FIG. 5 is a flowchart illustrating an example of steps of a process performed by the operation terminal according to Exemplary Embodiment 1;

FIG. 7 is a flowchart illustrating a different example of the steps performed by the operation terminal according to Exemplary Embodiment 1;

FIG. 9 is a table illustrating an example of a virtual-image DB according to Exemplary Embodiment 2;

FIG. 10 is a flowchart illustrating an example of steps of a process performed by the operation terminal according to Exemplary Embodiment 2;

FIG. 13 is a table illustrating an example of a virtual-image DB according to Exemplary Embodiment 3;

DETAILED DESCRIPTION

System Configuration

Hereinafter, exemplary embodiments of the present invention will be described in detail with reference to the attached drawings.

Figure 1:
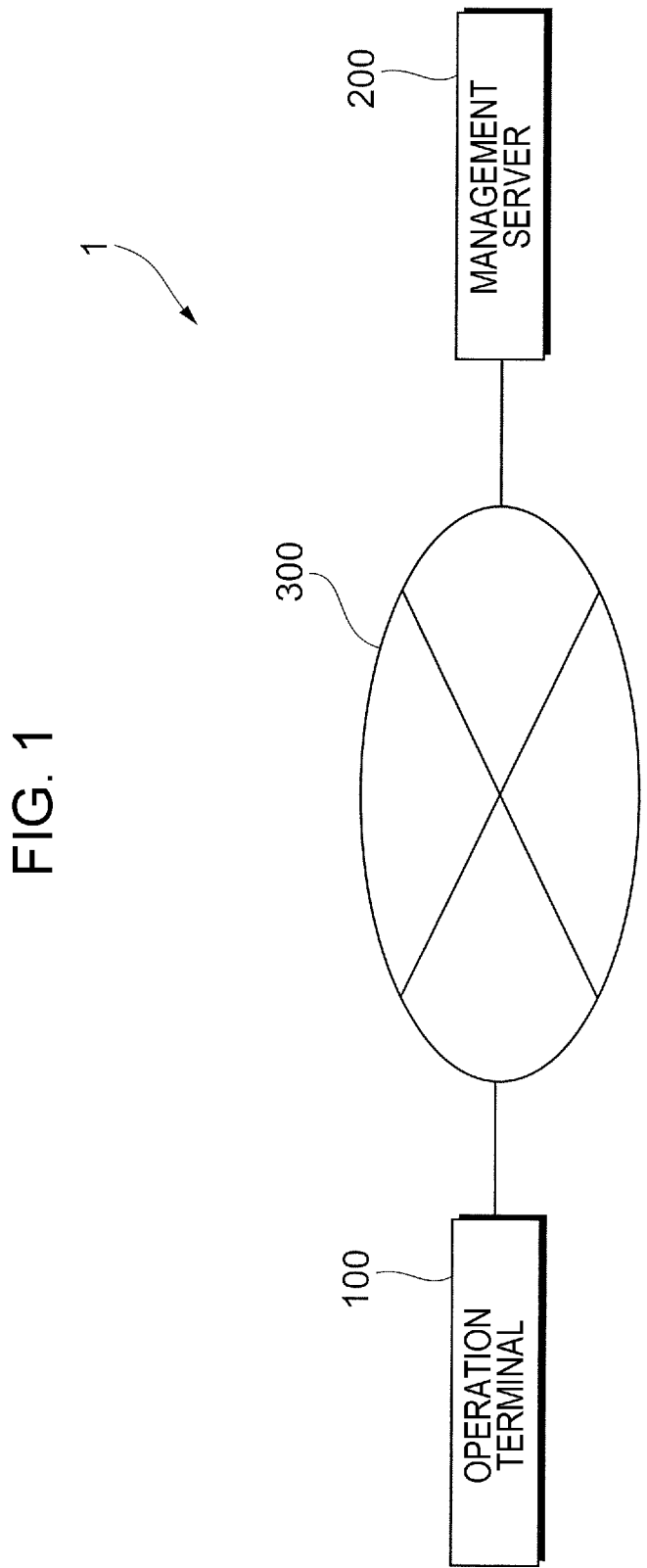
FIG. 1 is a diagram illustrating an example overall configuration of an information processing system according to the exemplary embodiments.

First, the overall configuration of an information processing system 1 according to the exemplary embodiments will be described. FIG. 1 is a diagram illustrating an example overall configuration of the information processing system 1 according to each exemplary embodiment. As illustrated in FIG. 1, the information processing system 1 includes an operation terminal 100 and a management server 200 that are connected to each other through a network 300.

The operation terminal 100 is a computer having a so-called augmented reality (AR) function. Examples of the operation terminal 100 include a mobile game machine, a mobile information terminal (such as a smartphone or a tablet terminal), and a personal computer (PC). A wearable computer such as wearable computer glasses is also usable as the operation terminal 100. The operation terminal 100 runs various programs such as applications in accordance with a user operation and executes a process for adding virtual space information to real space information, a process for incorporating the real space information into a virtual space, and other processes. Note that real space is space existing in reality, while virtual space does not exist in reality but is space virtually operable with the operation terminal 100.

The management server 200 is a computer that provides the operation terminal 100 with various pieces of information. Examples of the management server 200 include a PC and a workstation. The management server 200 provides the operation terminal 100 with various pieces of data to be used, for example, in a virtual space.

The network 300 is a communication medium used for information communication between the operation terminal 100 and the management server 200 and is, for example, the Internet, a public network, or a local area network (LAN).

Hardware Configuration of Operation Terminal

Figure 2:
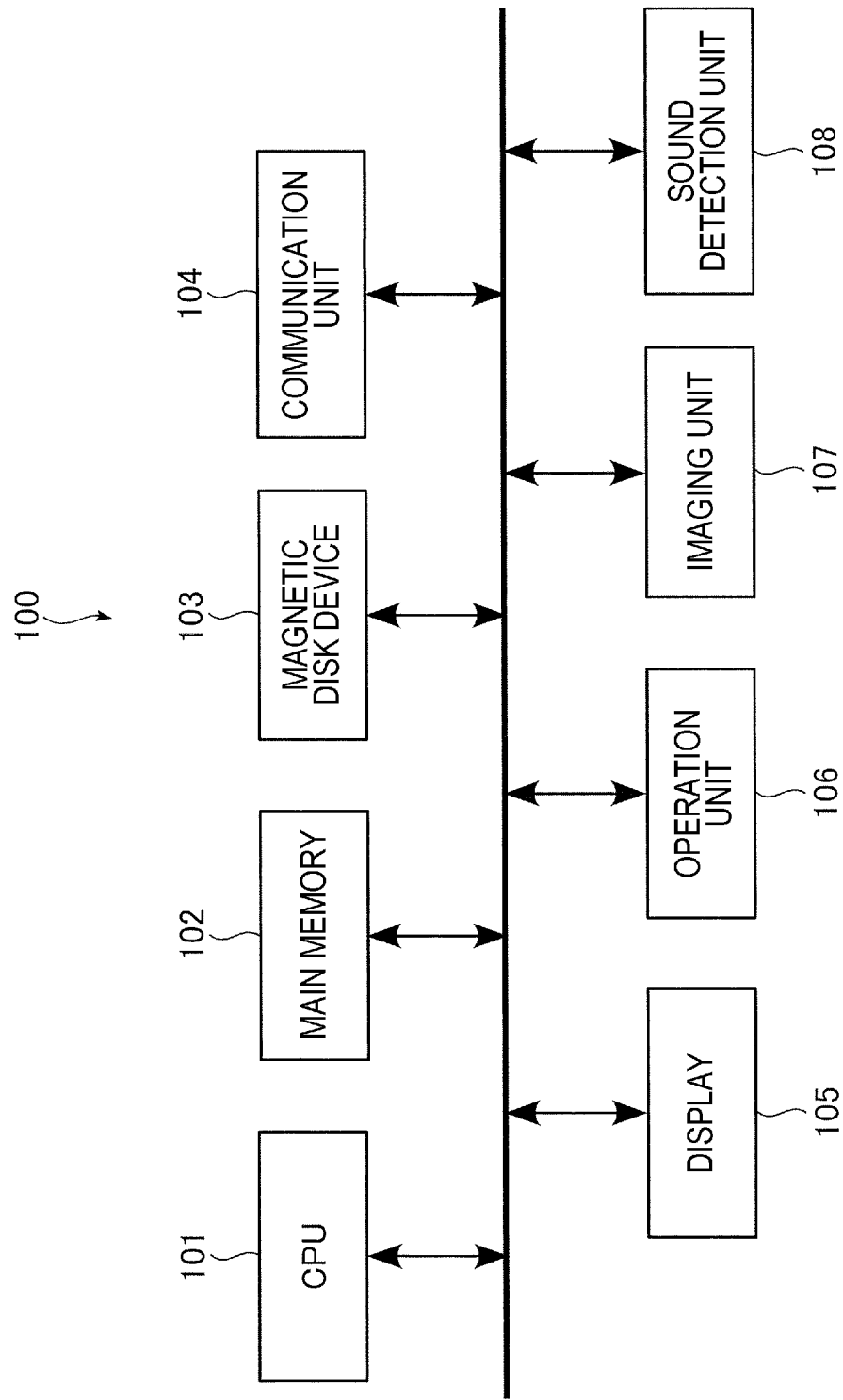
FIG. 2 is a diagram illustrating an example hardware configuration of an operation terminal according to the exemplary embodiments.

The hardware configuration of the operation terminal 100 according to the exemplary embodiment will be described. FIG. 2 is a diagram illustrating an example hardware configuration of the operation terminal 100 according to the exemplary embodiment.

As illustrated in FIG. 2, the operation terminal 100 includes a central processing unit (CPU) 101 that is an arithmetic unit, a main memory 102 that is a memory, and a magnetic disk device 103. The CPU 101 runs an operating system (OS) and various programs such as applications and thereby implements various functions of the operation terminal 100. The main memory 102 serves as a memory area where the various programs, data used for running the programs, and the like are stored. Further, the magnetic disk device 103 serves as a memory area where data to be input to the various programs, data output from the various programs, and the like are stored.

The operation terminal 100 also includes a communication unit 104 that is an interface for communicating with an external apparatus, a display 105 that includes a video memory, a display, and other components and that displays a screen, and an operation unit 106 that is an input device operable by a user. The operation unit 106 may be any input device, and examples of the operation unit 106 include an operation button, a keyboard, and a mouse. The display 105 and the operation unit 106 may be integrally formed by using a touch panel or the like that displays a screen and that thereby receives an operation from the user. The operation terminal 100 further includes an imaging unit 107 such as a camera that captures an image of a subject to acquire image data for a still image or a video, and a sound detection unit 108 such as a microphone that detects a sound outside the operation terminal 100.

Note that FIG. 2 merely exemplifies the hardware configuration of the operation terminal 100 preferable to apply the exemplary embodiment, and the configuration to implement the exemplary embodiment is not limited to the configuration illustrated in FIG. 2.

Exemplary Embodiment 1

Functional Configuration of Operation Terminal

The functional configuration of an operation terminal 100 according to Exemplary Embodiment 1 will be described. In Exemplary Embodiment 1, the operation terminal 100 acquires a data image of an image captured by using the imaging unit 107 in the real space through a user operation (hereinafter, an image based on image data and captured in the real space is referred to as a real data image). The operation terminal 100 divides the acquired real data image into regions corresponding to objects. Further, the operation terminal 100 identifies the attribute of each region (that is, the attribute of each object). The operation terminal 100 combines a real data image of a region with an image in virtual space based on image data (hereinafter, referred to as a virtual data image) associated with the attribute of the region.

Figure 3:
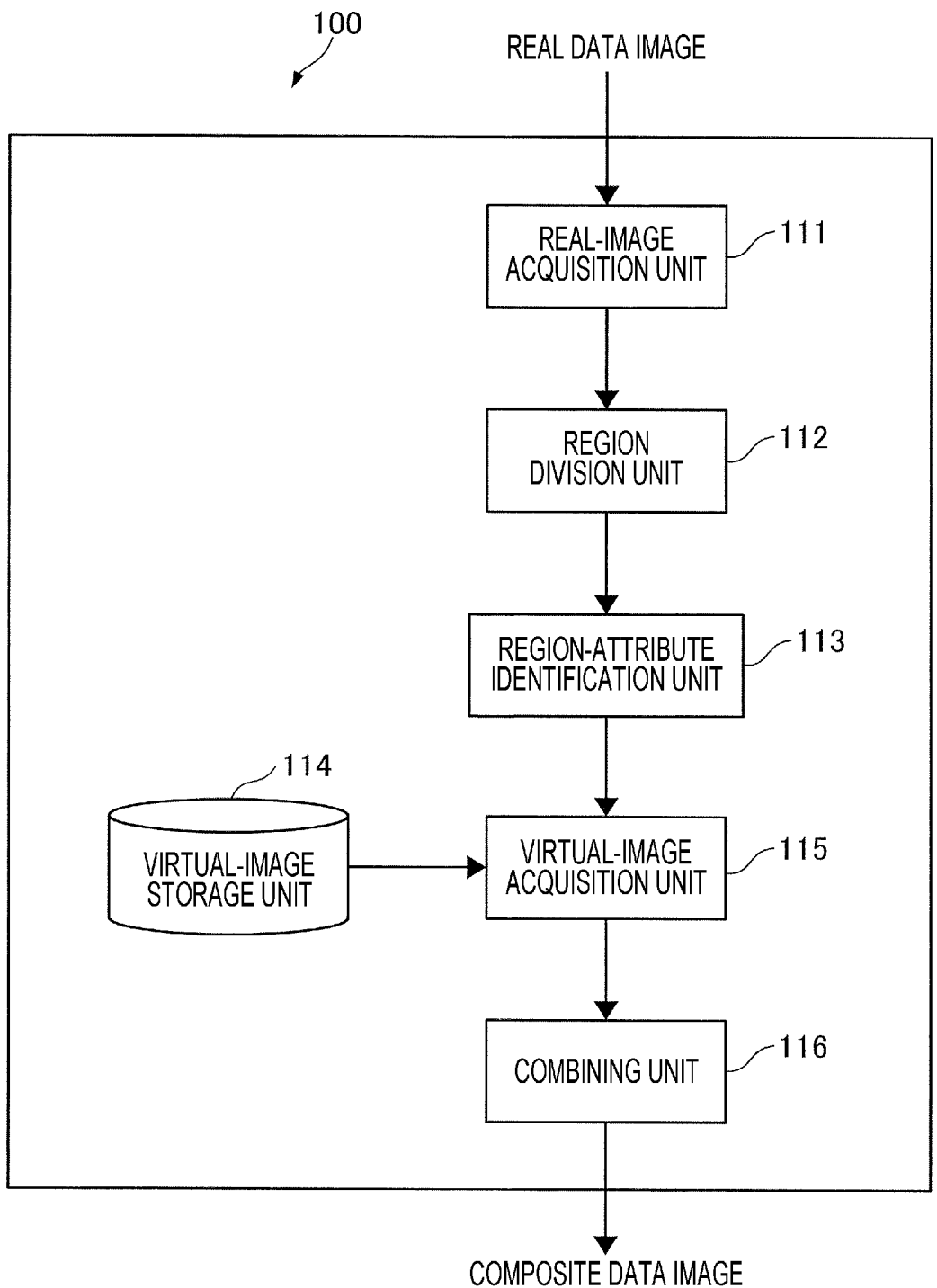
FIG. 3 is a block diagram illustrating an example functional configuration of an operation terminal according to Exemplary Embodiment 1.

FIG. 3 is a block diagram illustrating an example functional configuration of the operation terminal 100 according to Exemplary Embodiment 1. The operation terminal 100 according to this exemplary embodiment includes a real-image acquisition unit 111, a region division unit 112, a region-attribute identification unit 113, a virtual-image storage unit 114, a virtual-image acquisition unit 115, and a combining unit 116.

The real-image acquisition unit 111 acquires a real data image based on image data regarding an image captured in the real space by using the imaging unit 107.

The region division unit 112 divides the real data image into regions corresponding to the objects on the basis of a feature amount extracted from the real data image acquired by the real-image acquisition unit 111. An existing technique is usable for the region division. For example, an existing region division algorithm (such as a region extension method or graph cuts) is used. Examples of the used feature amount include pixel values of pixels in an image (such as brightness or color information) and the frequency of an image (spatial frequency).

The region-attribute identification unit 113 identifies the attribute of each region divided by the region division unit 112. The attribute may also be identified by using an existing technique.

For example, the region-attribute identification unit 113 compares the feature amount of the region divided by the region division unit 112 with reference feature amounts predetermined for the respective attributes. The region-attribute identification unit 113 identifies, as the attribute of the region, the attribute of a region having a reference feature amount closest to the feature amount of the region.

Alternatively, for example, the region-attribute identification unit 113 may identify the attribute of the region by using the machine learning in such a manner as to extract the pattern of an image having the attribute and a determination rule therefor. In this case, for example, the user prepares multiple images having the respective attributes as images for learning. The region-attribute identification unit 113 extracts the feature amount from each prepared image for learning and performs learning by associating the extracted feature amount with the attribute of the image. The region-attribute identification unit 113 performs the learning as described above and thereby identifies, as the attribute of the region, the attribute of the image for learning having a feature amount closest to the feature amount of the region.

The virtual-image storage unit 114 stores therein a database (hereinafter, referred to as a virtual-image DB) in which virtual data images corresponding to pieces of image data to be used in virtual space are specified. The virtual-image DB is an example of an association, and each virtual data image is associated with an attribute. The attribute represents a location where an object indicated by the corresponding virtual data image is present in the real space. More specifically, for example, a virtual data image of a bird is associated with the attribute "Sky" of the sky where the bird is present in the real space. In addition, for example, a virtual data image of a deer is associated with the attribute "Mountain" of a mountain where the deer is present in the real space.

The virtual-image acquisition unit 115 acquires a virtual data image from the virtual-image storage unit 114 as a data image to be combined with a real data image. The virtual-image acquisition unit 115 first selects one or more regions in accordance with a predetermined rule from among the regions (objects) of the real data image divided by the region division unit 112. The virtual-image acquisition unit 115 acquires a virtual data image associated with the attribute of each selected region from the virtual-image storage unit 114.

Note that examples of the predetermined rule include selecting the one or more regions in accordance with the priority or order assigned in advance to the attributes and selecting the one or more regions randomly.

The combining unit 116 combines the real data image of a region with a virtual data image associated with the attribute of the region. The combining unit 116 performs control to display, on the display 105, a data image obtained by the combination (hereinafter, referred to as a composite data image).

In this exemplary embodiment, the real-image acquisition unit 111 is used as an example of an image acquisition unit. The region-attribute identification unit 113 is used as an example of an attribute-information acquisition unit. The virtual-image acquisition unit 115 is used as an example of an identification unit. The combining unit 116 and the display 105 are each used as an example of a display. The virtual-image storage unit 114 is used as an example of a memory.

Note that the functional units included in the operation terminal 100 illustrated in FIG. 3 are implemented in cooperation between software and hardware resources. Specifically, to implement the operation terminal 100 by using the hardware configuration illustrated in FIG. 2, for example, the OS and application programs stored in the magnetic disk device 103 are loaded in the main memory 102 and run by the CPU 101, and the functions such as the real-image acquisition unit 111, the region division unit 112, the region-attribute identification unit 113, the virtual-image acquisition unit 115, and the combining unit 116 are thereby implemented. The virtual-image storage unit 114 is implemented by a memory such as the magnetic disk device 103.

Virtual-image DB

The virtual-image DB will be described. FIG. 4 is a table illustrating an example of the virtual-image DB according to Exemplary Embodiment 1.

As "Attribute", attributes respectively associated with virtual data images in advance are illustrated. FIG. 2 illustrates a bird as a virtual data image associated with, for example, the attribute "Sky" and a deer as a virtual data image associated with, for example, the attribute "Mountain". Each attribute may be associated with multiple virtual data images. The example in FIG. 2 illustrates a fish and a whale as virtual data images associated with the attribute "Sea".

Steps of Process Performed by Operation Terminal

Steps of a process performed by the operation terminal 100 according to this exemplary embodiment will be described. FIG. 5 is a flowchart illustrating an example of the steps of the process performed by the operation terminal 100 according to Exemplary Embodiment 1.

First, when the user operates the operation terminal 100 and captures an image of a subject by using the imaging unit 107, the real-image acquisition unit 111 acquires a real data image captured by using the imaging unit 107 (step S101). The region division unit 112 divides the real data image into regions on the basis of feature amounts extracted from the real data image (step S102). The region-attribute identification unit 113 identifies the attribute of each region (object) resulting from the division performed by the region division unit 112 (step S103).

The virtual-image acquisition unit 115 selects one or more regions in accordance with the predetermined rule from among the regions of the real data image (step S104). The virtual-image acquisition unit 115 acquires, from the virtual-image storage unit 114, one or more virtual data images respectively associated with one or more attributes of the selected one or more regions (step S105). The combining unit 116 combines the real data image of each of the selected one or more regions with the corresponding virtual data image acquired by the virtual-image acquisition unit 115 and thereby generates a composite data image (step S106). The combining unit 116 displays the composite data image on the display 105 (step S107). The process is then terminated.

More specifically, for example, in step S104, the virtual-image acquisition unit 115 selects a sky image and a mountain image. In step S105, the virtual-image acquisition unit 115 acquires a virtual data image of a bird and a virtual data image of a deer as virtual data images respectively associated with the attributes of the regions. In this case, in step S106, the combining unit 116 combines the sky image with the virtual data image of a bird and combines the mountain image with the virtual data image of a deer. The combining unit 116 thereby generates a composite data image.

Here, a case where the user records a video by using the imaging unit 107 will particularly be described. While a video is being recorded, a subject recorded by the user changes over time. Accordingly, the process illustrated in FIG. 5 is repeated, for example, every period of time corresponding to one frame (for example, about every 17 msec in the case of 60 fps). In step S104, the same region as the previously acquired region (or a region including the acquired region) is acquired repeatedly. Also in step S105, the same virtual data image as the previously acquired virtual data image is acquired repeatedly. Each virtual data image is repeatedly combined for the video.

A Series of Steps Performed by Operation Terminal

Figure 6A:
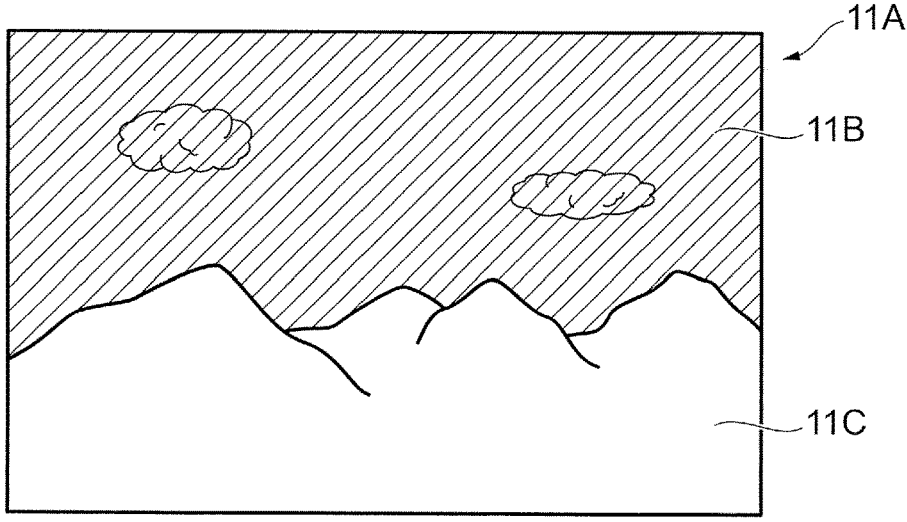
FIGS. 6A, 6B, and 6C are diagrams for explaining an example of a series of steps performed by the operation terminal according to Exemplary Embodiment 1.
Figure 6B:
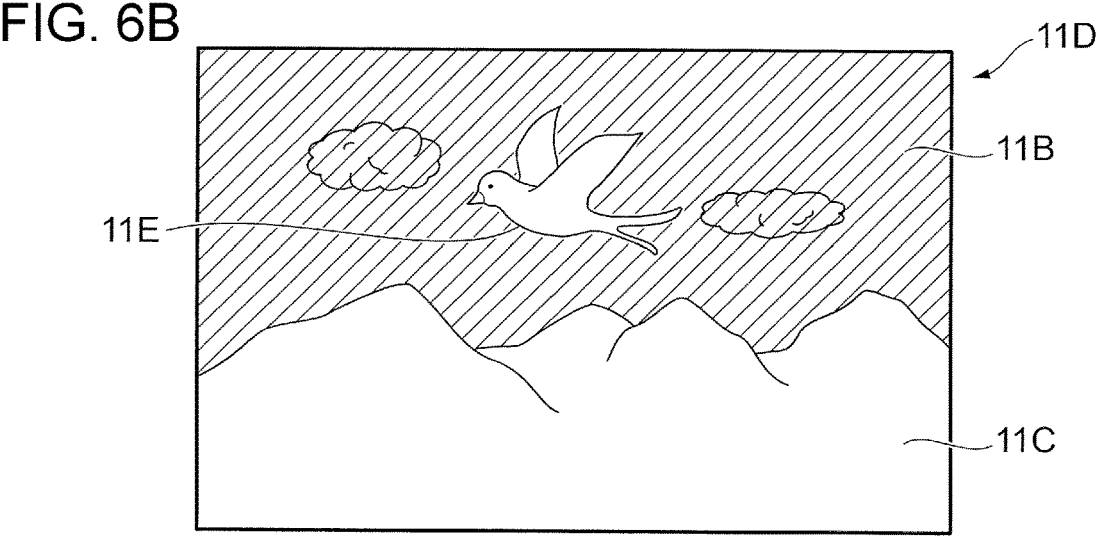
Figure 6C:
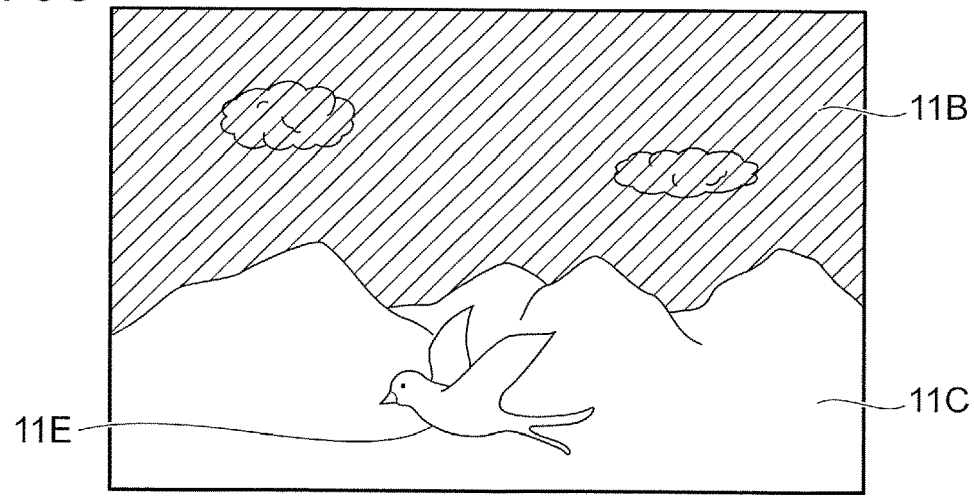

A series of steps performed by the operation terminal 100 according to this exemplary embodiment will be described. FIGS. 6A to 6C are diagrams for explaining an example of the series of steps performed by the operation terminal 100 according to Exemplary Embodiment 1.

FIG. 6A is a diagram illustrating an example of a real data image 11A captured by using the imaging unit 107. For example, the user operates the operation terminal 100 and captures an image of a subject by using the imaging unit 107. As the result, the real-image acquisition unit 111 acquires the real data image 11A illustrated in FIG. 6A as a data image captured by using the imaging unit 107. The real data image 11A illustrated in FIG. 6A is an image of the sky and mountains captured by the user. The real data image 11A includes a data image 11B and a data image 11C that are a sky image and a mountain image, respectively.

After the real-image acquisition unit 111 acquires the real data image 11A, the region division unit 112 divides the real data image 11A into regions on the basis of feature amounts extracted from the real data image 11A. The region division unit 112 divides the real data image 11A into the data image 11B and the data image 11C. The region-attribute identification unit 113 identifies the attributes of the divided data image 11B and the divided data image 11C, respectively. More specifically, the region-attribute identification unit 113 compares, for example, the feature amount of the data image 11B with the reference feature amount predetermined on a per-attribute basis and thereby identifies the attribute of the data image 11B. The attribute of the data image 11B and the attribute of the data image 11C are herein identified as the attribute "Sky" and the attribute "Mountain", respectively.

The virtual-image acquisition unit 115 selects one or more regions in accordance with the predetermined rule from among the regions of the real data image divided by the region division unit 112. In the example illustrated in FIG. 6A, the virtual-image acquisition unit 115 selects the data image 11B that is a region having the attribute "Sky". The virtual-image acquisition unit 115 subsequently acquires, from the virtual-image storage unit 114, the virtual data image of a bird associated with the attribute "Sky". Subsequently, the combining unit 116 combines the data image 11B having the attribute "Sky" with the virtual data image of a bird and thereby generates a composite data image.

FIG. 6B is a diagram illustrating an example of a composite data image 11D. In the composite data image 11D illustrated in FIG. 6B, the data image 11B having the attribute "Sky" is combined with a virtual data image 11E of a bird as described above.

Note that, it is conceivable that a virtual data image is combined with a real data image, for example, without determining the attribute of a region of the real data image, that is, on the basis of information regarding the location in the real space that is acquirable from, for example, a global positioning system (GPS). In this case, the virtual data image is combined on the basis of the information regarding the location in the real space regardless of a subject in the real space an image of which is captured. Accordingly, as illustrated in FIG. 6C, the data image 11C having the attribute "Mountain" might be combined with the virtual data image 11E of a bird. In this case, the bird is present in the sky in the real space but is displayed as if the bird were present in the mountain. The result is an unnatural composite causing the user to experience an unusual sensation and is not accompanied by a feeling of actually being present.

In contrast, in this exemplary embodiment, the combining unit 116 combines a virtual data image on the basis of the attribute of a region of a real data image. The result is a natural composite that does not cause the user to experience an unusual sensation and is thus accompanied by a feeling of actually being present.

In addition, if the user records a video by using the imaging unit 107, the location and the size of the sky and mountain images in frames of the video change over time. Accordingly, for example, if the virtual-image acquisition unit 115 acquires the virtual data image 11E of a bird for the frames, the combining unit 116 combines the data images 11B of the sky that change over time in the respective frames with the virtual data image 11E of a bird. As an additional explanation, for example, if the video recorded by the user has a frame that does not include the sky and that corresponds to a certain period of time, the virtual data image 11E of a bird is not combined with the real data image 11A in the frame corresponding to the period of time.

Different Example of Steps Performed by Operation Terminal

A different example of the steps performed by the operation terminal 100 will be described. In the aforementioned example, the virtual-image acquisition unit 115 selects one or more regions of a real data image, and the combining unit 116 combines a real data image of each region with a virtual data image. In contrast, in the different example, the virtual-image acquisition unit 115 acquires a virtual data image (predetermined data image) in accordance with a predetermined rule. The combining unit 116 then identifies the attribute of the acquired virtual data image on the basis of the identified attribute and determines a region (location) of the virtual data image to be combined in the real data image. Note that in this exemplary embodiment, the combining unit 116 is used as an example of a location identification unit.

FIG. 7 is a flowchart illustrating the different example of the steps performed by the operation terminal 100 according to Exemplary Embodiment 1.

Since steps S201 to S203 are the same as steps S101 to S103 in FIG. 5, explanation thereof is herein omitted. After the region-attribute identification unit 113 identifies the attribute of each region of the real data image in step S203, the virtual-image acquisition unit 115 acquires a virtual data image from the virtual-image storage unit 114 in accordance with a predetermined rule (step S204). Examples of the predetermined rule include acquiring a virtual data image in accordance with the priority or order assigned in advance to the virtual data image and acquiring the virtual data image randomly.

The combining unit 116 identifies the attribute associated with the virtual data image acquired by the virtual-image acquisition unit 115 on the basis of information stored in the virtual-image storage unit 114. The combining unit 116 judges whether a region having the identified attribute is present in the real data image (step S205). If the combining unit 116 does not judge that a region having the identified attribute is present (No in step S205), the process is terminated without combining the virtual data image.

In contrast, if the combining unit 116 judges that a region having the identified attribute is present (Yes in step S205), the combining unit 116 combines a real data image of the region with the virtual data image and thereby generates a composite data image (step S206). As an additional explanation, steps S205 and S206 may be regarded as a step of identifying a location for combining a virtual data image with the real data image on the basis of the attribute of the virtual data image. The combining unit 116 displays the composite data image on the display 105 (step S207). The process is then terminated.

More specifically, for example, in step S204, the virtual-image acquisition unit 115 acquires a virtual data image of a bird. In step S205, the combining unit 116 identifies, as "Sky", the attribute associated with the virtual data image of a bird. If a region having the attribute "Sky" is present (Yes in step S205), the combining unit 116 combines a sky image with the virtual data image of a bird and thereby generates a composite data image. The process is then terminated.

Note that in step S204, the virtual-image acquisition unit 115 may acquire multiple virtual data images. In this case, steps S205 and S206 are performed for each virtual data image. Specifically, it is judged whether a region having the attribute of the virtual data image is present, and if the region is present, the virtual data image is combined with the real data image.

In this exemplary embodiment as described above, the operation terminal 100 combines the real data image captured by using the imaging unit 107, in a region of the real data image, with a virtual data image associated with the attribute of the region. Accordingly, the result is a natural composition that does not cause the user to experience an unusual sensation and is thus accompanied by a feeling of actually being present compared with, for example, a configuration in which combination is performed without taking the attribute of a region of a real data image and the attribute of a virtual data image into consideration.

Exemplary Embodiment 2

Functional Configuration of Operation Terminal

The functional configuration of an operation terminal 100 according to Exemplary Embodiment 2 will be described. In Exemplary Embodiment 1, the operation terminal 100 combines a real data image with a virtual data image and thereby generates a composite data image. In contrast, in Exemplary Embodiment 2, the operation terminal 100 identifies the attribute of an object in the real data image and performs a process of incorporating information regarding the object into a virtual space by using a virtual data image associated with the attribute.

Figure 8:
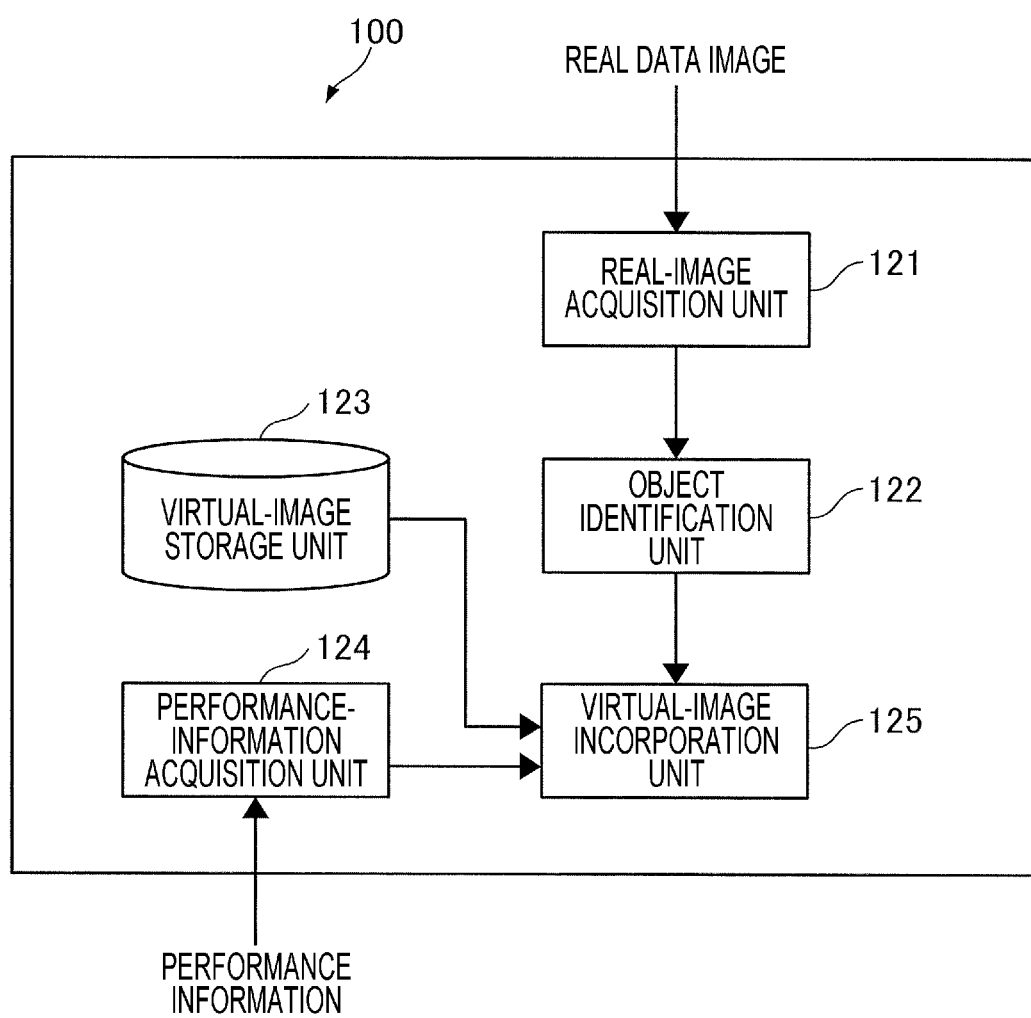
FIG. 8 is a block diagram illustrating an example functional configuration of an operation terminal according to Exemplary Embodiment 2.

FIG. 8 is a block diagram illustrating an example functional configuration of the operation terminal 100 according to Exemplary Embodiment 2. The operation terminal 100 according to this exemplary embodiment includes a real-image acquisition unit 121, an object identification unit 122, a virtual-image storage unit 123, a performance-information acquisition unit 124, and a virtual-image incorporation unit 125.

The real-image acquisition unit 121 acquires a real data image based on image data regarding an image captured in the real space by using the imaging unit 107.

The object identification unit 122 identifies the attribute of an object on the basis of the image of a predetermined object included in the real data image acquired by the real-image acquisition unit 121. To identify the attribute, an existing technique is usable. For example, the user actually captures images of various objects and thereby prepares pieces of image data regarding the objects. The object identification unit 122 performs image processing such as pattern matching on the acquired real data image and thereby identifies the attribute of the object.

The virtual-image storage unit 123 stores therein a virtual-image DB that is a database in which virtual data images corresponding to pieces of image data to be used in virtual space are specified. In the virtual-image DB, virtual data images corresponding to predetermined objects are specified on a per-predetermined-object-attribute basis. Further, on a per-predetermined-object-attribute basis, data images acquired, for example, by actually capturing images of the objects are also stored. More specifically, for example, if a racing game is played in the virtual space, the virtual-image DB stores therein virtual data images on a per-motor-cycle-accessory-attribute basis, such as for a muffler, a tire, and a handle bar. In addition, on a per-motor-cycle-accessory-attribute basis, data images acquired, for example, by actually capturing images of the motor cycle accessories are also stored.

The performance-information acquisition unit 124 acquires information regarding the performance of the object the attribute of which is identified by the object identification unit 122 (hereinafter, referred to as performance information). The performance-information acquisition unit 124 acquires object performance information from an external apparatus such as the management server 200 through the network 300. More specifically, the performance-information acquisition unit 124 searches for the object, for example, through the Internet and thereby acquires the object performance information.

The virtual-image incorporation unit 125 executes a process for incorporating the object performance information acquired by the performance-information acquisition unit 124 and a virtual data image corresponding to the object in the virtual space. In the incorporation process, the virtual-image incorporation unit 125 acquires, from the virtual-image storage unit 123, the virtual data image corresponding to the object the attribute of which is identified by the object identification unit 122, in other words, the virtual data image associated with the attribute of the object. The virtual-image incorporation unit 125 incorporates, into the virtual space, the performance information and the virtual data image in association with each other. The incorporation into the virtual space causes the virtual data image to function as an image of the object having the performance indicated by the performance information in the virtual space.

More specifically, for example, if a racing game is to be played, the object identification unit 122 identifies a muffler as the attribute of an object. In this case, the performance-information acquisition unit 124 searches for the muffler through the Internet and acquires the performance information regarding the muffler. The virtual-image incorporation unit 125 acquires a virtual data image corresponding to the muffler from the virtual-image storage unit 123. The virtual-image incorporation unit 125 incorporates, into the racing game, the performance information and the virtual data image in association with each other. The incorporation into the racing game enables the user to use, in the racing game, the muffler having the performance indicated by the performance information.

In this exemplary embodiment, the performance-information acquisition unit 124 is used as an example of a performance-information acquisition unit. The virtual-image incorporation unit 125 is used as an example of each of an identification unit and an incorporation unit.

Note that like the functional units included in the operation terminal 100 illustrated in FIG. 3, the functional units included in the operation terminal 100 illustrated in FIG. 8 are implemented in cooperation between the software and hardware resources. Specifically, to implement the operation terminal 100 by using the hardware configuration illustrated in FIG. 2, the OS and application programs stored in the magnetic disk device 103 are loaded in the main memory 102 and run by the CPU 101, and the functions such as the real-image acquisition unit 121, the object identification unit 122, the performance-information acquisition unit 124, and the virtual-image incorporation unit 125 are thereby implemented. The virtual-image storage unit 123 is implemented by a memory such as the magnetic disk device 103.

Virtual-Image DB

The virtual-image DB will be described. FIG. 9 is a table illustrating an example of the virtual-image DB according to Exemplary Embodiment 2.

As "Object attribute", attributes of the predetermined objects are illustrated. In the example in FIG. 9, "Muffler from Company A", "Muffler from Company B", and "Tire from Company C" are illustrated as motor cycle accessories. As "Captured data image", data images acquired by actually capturing images of objects are illustrated. As "Virtual data image", data images for a case where objects are used in the virtual space such as the racing game are illustrated.

Steps of Process Performed by Operation Terminal

Steps of a process performed by the operation terminal 100 according to this exemplary embodiment will be described. FIG. 10 is a flowchart illustrating an example of the steps of the process performed by the operation terminal 100 according to Exemplary Embodiment 2.

When the user operates the operation terminal 100 and captures an image of a subject by using the imaging unit 107, the real-image acquisition unit 121 acquires a real data image captured by using the imaging unit 107 (step S301). The object identification unit 122 judges whether the real data image has an attribute of a predetermined object on the basis of information stored in the virtual-image storage unit 123 (step S302). If the object identification unit 122 does not judge that the real data image has an attribute of a predetermined object (No in step S302), the process is terminated.

In contrast, if the object identification unit 122 judges that the real data image has an attribute of a predetermined object (Yes in step S302), the performance-information acquisition unit 124 acquires performance information corresponding to the predetermined object (step S303). The virtual-image incorporation unit 125 acquires a virtual data image associated with the predetermined object from the virtual-image storage unit 123 (step S304). The virtual-image incorporation unit 125 incorporates, into the virtual space, the performance information and the virtual data image in association with each other (step S305). The process is then terminated.

A Series of Steps Performed by Operation Terminal

Figure 11A:
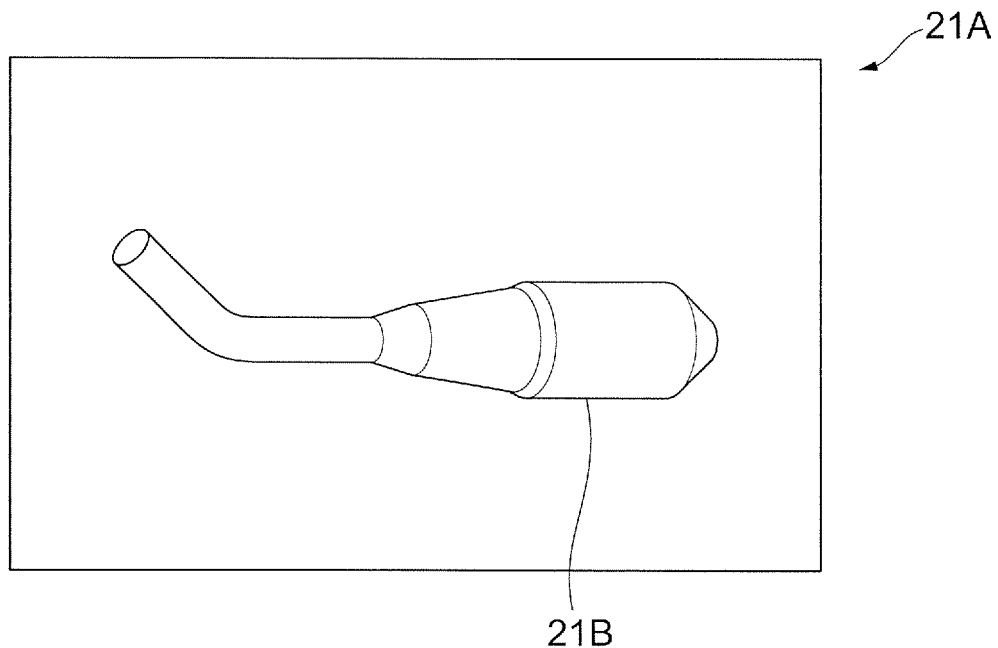
FIGS. 11A and 11B are diagrams for explaining an example of a series of steps performed by the operation terminal according to Exemplary Embodiment 2.
Figure 11B:
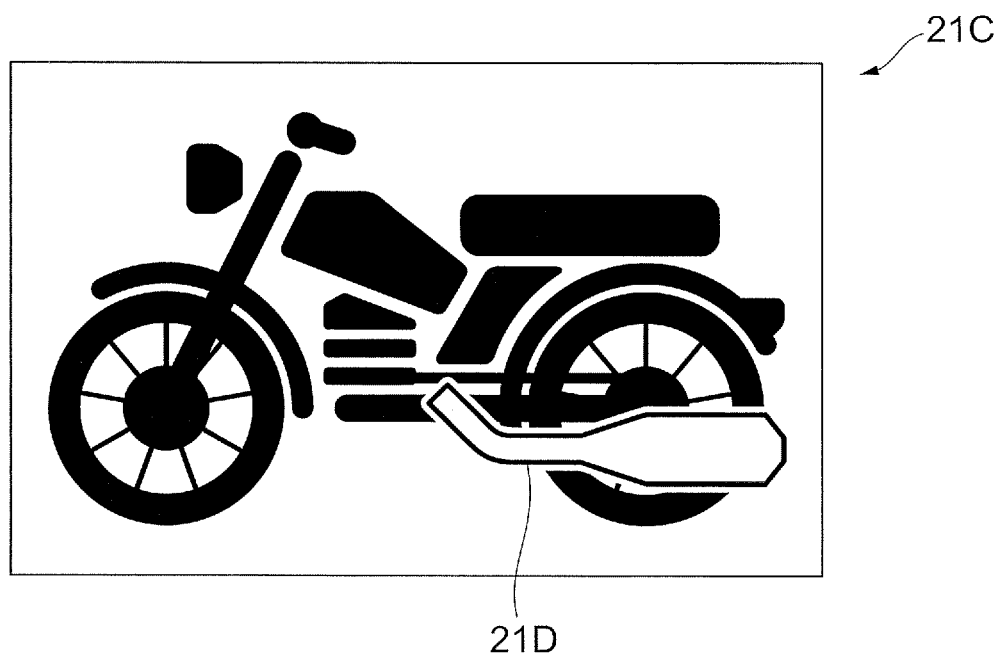

A series of steps performed by the operation terminal 100 according to this exemplary embodiment will be described. FIGS. 11A and 11B are diagrams for explaining an example of the series of steps performed by the operation terminal 100 according to Exemplary Embodiment 2. A case where a racing game is played in the virtual space will be described as an example.

FIG. 11A is a diagram illustrating an example of a real data image 21A captured by using the imaging unit 107. For example, the user operates the operation terminal 100 and captures an image of a subject by using the imaging unit 107. As the result, the real-image acquisition unit 111 acquires the real data image 21A illustrated in FIG. 11A as a data image captured by using the imaging unit 107. The real data image 21A illustrated in FIG. 11A is an image of the muffler of a motor cycle captured by the user and includes a data image 21B as a muffler image.

After the real-image acquisition unit 121 acquires the real data image 21A, the object identification unit 122 judges whether the real data image 21A has an attribute of a predetermined object on the basis of the information stored in the virtual-image storage unit 123. For example, if the data image 21B is the same as (or similar to) a captured image of a muffler from Company A illustrated in FIG. 9, the object identification unit 122 judges that the real data image 21A has an attribute of a predetermined object on the basis of pattern matching or the like.

The performance-information acquisition unit 124 acquires, from the external apparatus such as the management server 200 through the network 300, performance information regarding the muffler from Company A the attribute of which is judged to be included in the real data image 21A. For example, information indicating a capacity of 296 ps (pferde starke (horsepower)) and a torque of 38 kgm is acquired as the performance information regarding the muffler from Company A. The virtual-image incorporation unit 125 acquires a virtual data image associated with "Muffler from Company A" from the virtual-image storage unit 123. The virtual-image incorporation unit 125 incorporates, into the racing game, the performance information and the virtual data image in association with each other.

FIG. 11B is a diagram illustrating an example of a data image 21C that is displayed on the display 105 after being incorporated into the racing game. In the example illustrated in FIG. 11B, a virtual data image 21D associated with "Muffler from Company A" is displayed on the display 105 as the image of the muffler captured by the user, with the motor cycle provided with the virtual data image 21D. The user may use, in the racing game, the muffler from Company A having the performance indicated by the performance information.

In this exemplary embodiment as described above, the operation terminal 100 identifies the attribute of an object from a real data image captured by using the imaging unit 107 and incorporates, into the virtual space, a virtual data image and performance information that correspond to the object the attribute of which is identified. The incorporation of the virtual data image and the performance information into the virtual space enables the user to use, in the virtual space, information regarding the object in the subject the image of which is captured.

Note that although the virtual-image incorporation unit 125 acquires the performance information from the external apparatus such as the management server 200 through the network 300 in this exemplary embodiment, the performance information may be included in the virtual-image DB. In this case, the virtual-image DB illustrated in FIG. 9 also stores therein pieces of performance information on a per-object-attribute basis, such as for "Muffler from Company A", "Muffler from Company B", and "Tire from Company C".

In addition, although the real-image acquisition unit 121 acquires an image actually captured using the imaging unit 107 in this exemplary embodiment, the configuration is not limited to such a configuration. For example, the real-image acquisition unit 121 may acquire a data image captured by using another imaging unit from the management server 200 through the network 300 or from a recording medium such as a compact disc read-only memory (CD-ROM).

Exemplary Embodiment 3

Functional Configuration of Operation Terminal

The functional configuration of an operation terminal 100 according to Exemplary Embodiment 3 will be described. In Exemplary Embodiment 2, the operation terminal 100 identifies the attribute of an object from a real data image and executes the process for incorporating, into the virtual space, performance information regarding the object the attribute of which is identified. In Exemplary Embodiment 3, the operation terminal 100 identifies the attribute of an object from a sound (sound data) and executes a process for incorporating, into the virtual space, performance information regarding the object the attribute of which is identified.

Figure 12:
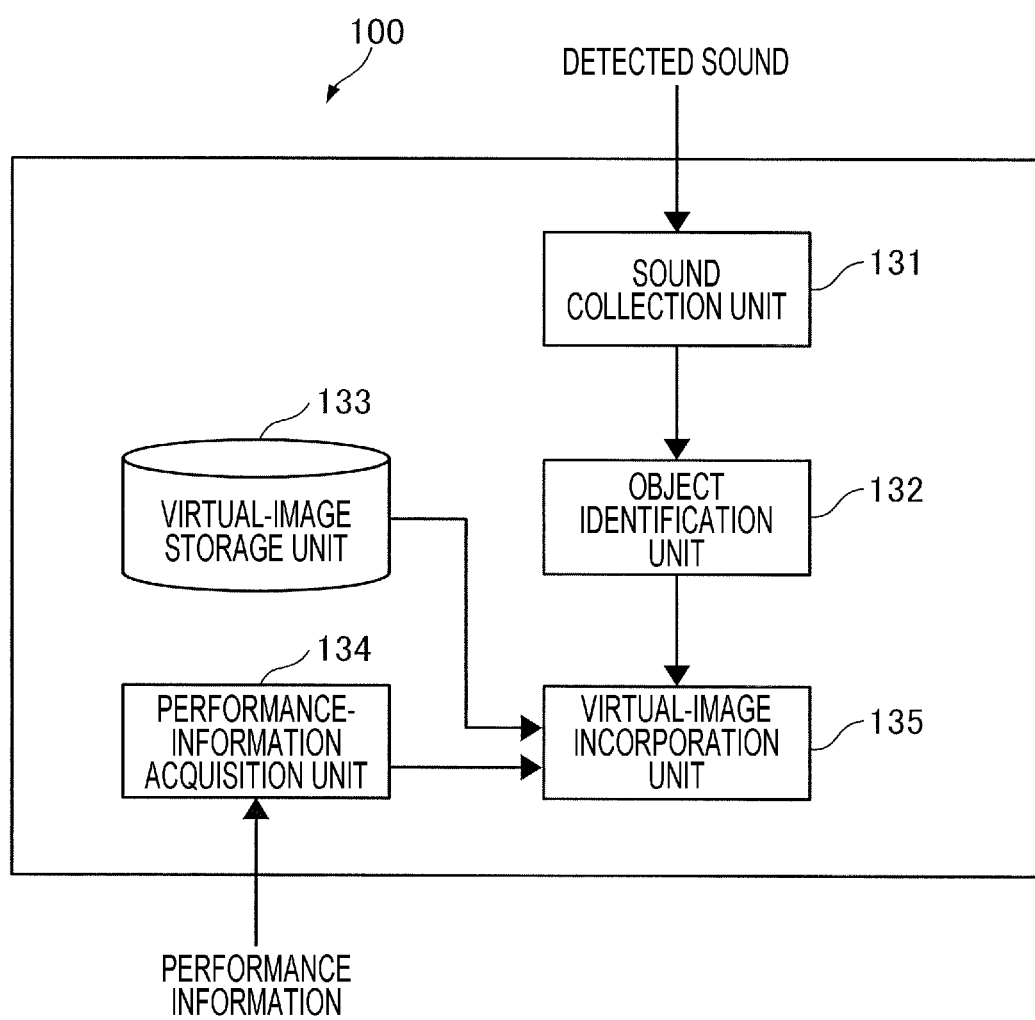
FIG. 12 is a block diagram illustrating an example functional configuration of an operation terminal according to Exemplary Embodiment 3.

FIG. 12 is a block diagram illustrating an example functional configuration of the operation terminal 100 according to Exemplary Embodiment 3. The operation terminal 100 according to this exemplary embodiment includes a sound collection unit 131, an object identification unit 132, a virtual-image storage unit 133, a performance-information acquisition unit 134, and a virtual-image incorporation unit 135.

The sound collection unit 131 collects a sound (sound data) detected in the real space by the sound detection unit 108 and records the collected sound in a memory such as the magnetic disk device 103.

The object identification unit 132 identifies the attribute of an object on the basis of the sound of a predetermined object (a sound emitted from the predetermined object) included in the sound collected by the sound collection unit 131. An existing technique is usable for the identification. For example, the user has prepared sounds for various objects. The object identification unit 132 performs processing such as pattern matching on, for example, the waveform of the sound collected by the sound collection unit 131 and thereby identifies the attribute of the object.

The virtual-image storage unit 133 stores therein a virtual-image DB that is a database in which virtual data images corresponding to pieces of image data to be used in virtual space. In the virtual-image DB, virtual data images corresponding to predetermined objects are specified on a per-predetermined-object-attribute basis. Further on a per-predetermined-object-attribute basis, sounds associated with the respective objects are also stored. More specifically, for example, if a racing game is played in the virtual space, the virtual-image DB stores therein virtual data images on a per-automobile-attribute basis, such as for "Automobile from Company A" and "Automobile from Company B". On a per-automobile-attribute basis, sounds such as an engine sound and a door closing sound of the automobiles are also stored as sounds associated with the respective automobiles.

The performance-information acquisition unit 134 acquires performance information indicating the performance of the object the attribute of which is identified by the object identification unit 132. The performance-information acquisition unit 134 acquires the object performance information from an external apparatus such as the management server 200 through the network 300. More specifically, the performance-information acquisition unit 134 searches for the object, for example, through the Internet and thereby acquires the object performance information.

The virtual-image incorporation unit 135 executes a process for incorporating, into the virtual space, the performance information regarding the object that is acquired by the performance-information acquisition unit 134 and a virtual data image corresponding to the object. The virtual-image incorporation unit 135 acquires, from the virtual-image storage unit 133, the virtual data image corresponding to the object the attribute of which is identified by the object identification unit 132, in other words, the virtual data image associated with the attribute of the object. The virtual-image incorporation unit 135 incorporates, into the virtual space, the performance information and the virtual data image in association with each other. The incorporation into the virtual space causes the virtual data image to function as an image of the object having the performance indicated by the performance information in the virtual space.

More specifically, for example, if a racing game is to be played, the object identification unit 132 identifies "Automobile from Company A" as the attribute of the object. In this case, the performance-information acquisition unit 134 searches for the automobile from Company A through the Internet and acquires the performance information regarding the automobile from Company A. The virtual-image incorporation unit 135 acquires a virtual data image corresponding to the automobile from Company A from the virtual-image storage unit 133. The virtual-image incorporation unit 135 incorporates, into the racing game, the performance information and the virtual data image in association with each other. The incorporation into the racing game enables the user to use, in the racing game, the automobile from Company A having the performance indicated by the performance information.

In this exemplary embodiment, the performance-information acquisition unit 134 is used as an example of a performance-information acquisition unit. The virtual-image incorporation unit 135 is used as an example of each of the identification unit and the incorporation unit.

Note that like the functional units included in the operation terminal 100 illustrated in FIG. 3, the functional units included in the operation terminal 100 illustrated in FIG. 12 are implemented in cooperation between the software and hardware resources. Specifically, to implement the operation terminal 100 by using the hardware configuration illustrated in FIG. 2, the OS and application programs stored in the magnetic disk device 103 are loaded in the main memory 102 and run by the CPU 101, and the functions such as the sound collection unit 131, the object identification unit 132, the performance-information acquisition unit 134, and the virtual-image incorporation unit 135 are thereby implemented. The virtual-image storage unit 133 is implemented by a memory such as the magnetic disk device 103.

Virtual-Image DB

The virtual-image DB will be described. FIG. 13 is a table illustrating an example of the virtual-image DB according to Exemplary Embodiment 3.

As "Object attribute", attributes of the predetermined objects are illustrated. In the example in FIG. 13, "Automobile from Company A", "Automobile from Company B", and "Automobile from Company C" are illustrated as automobiles. As "Sound", sounds associated with the respective objects are illustrated. For example, an engine sound of the automobile from Company A and a door closing sound of the automobile from Company A are illustrated as sounds of the automobile from Company A. Although characters are used in the example in FIG. 13 such as "Engine sound" and "Door closing sound", pieces of data regarding sounds such an actual engine sound and an actual door closing sound are stored in the virtual-image DB. In addition, as "Virtual data image", data images for a case where objects are used in the virtual space such as the racing game.

Steps of Process Performed by Operation Terminal

Figure 14:
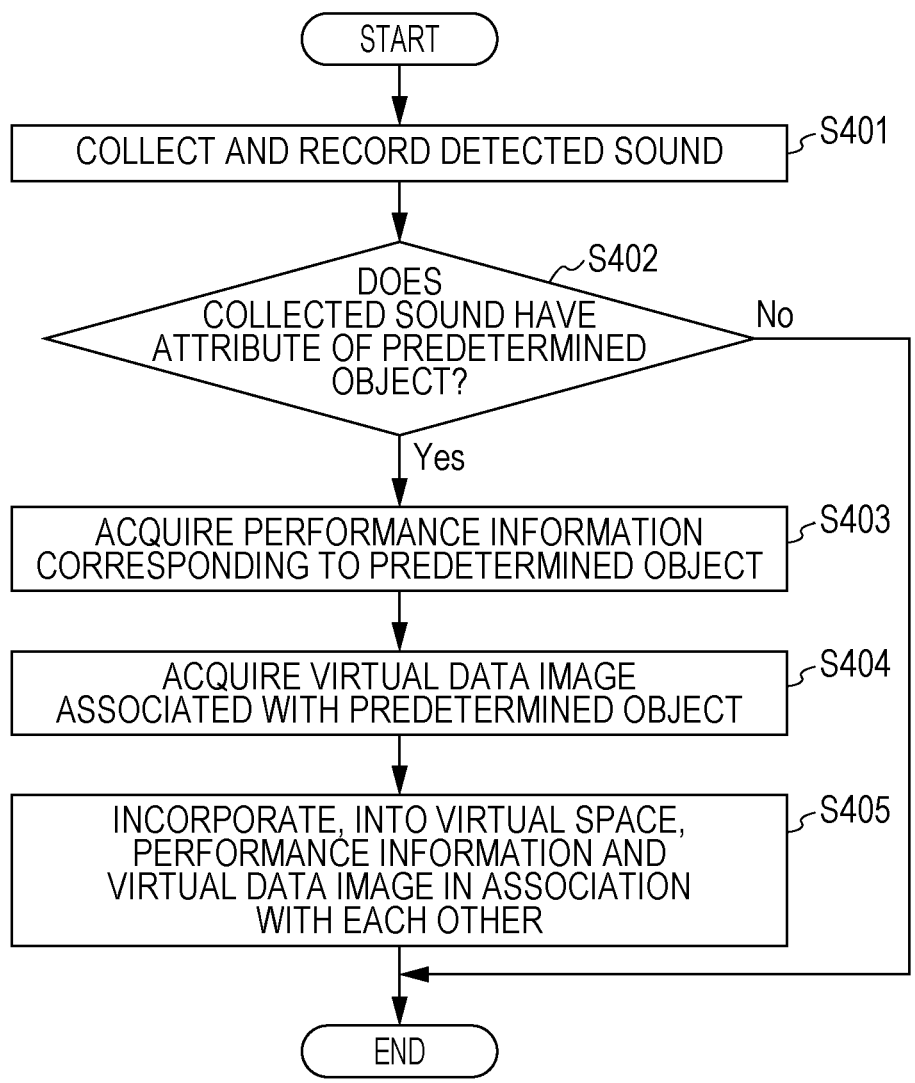
FIG. 14 is a flowchart illustrating an example of steps of a process performed by the operation terminal according to Exemplary Embodiment 3.

Steps of a process performed by the operation terminal 100 according to this exemplary embodiment will be described. FIG. 14 is a flowchart illustrating an example of the steps of the process performed by the operation terminal 100 according to Exemplary Embodiment 3.

When the user operates the operation terminal 100 and when the sound detection unit 108 detects a sound, the sound collection unit 131 collects the sound and records the sound in the memory (step S401). The object identification unit 132 judges whether the sound collected by the sound collection unit 131 has an attribute of a predetermined object on the basis of the information stored in the virtual-image storage unit 133 (step S402). If the object identification unit 132 does not judge that the sound has an attribute of a predetermined object (No in step S402), the process is terminated.

In contrast, if the object identification unit 132 judges that the sound has an attribute of a predetermined object (Yes in step S402), the performance-information acquisition unit 134 acquires performance information corresponding to the predetermined object (step S403). The virtual-image incorporation unit 135 acquires a virtual data image associated with the predetermined object from the virtual-image storage unit 133 (step S404). The virtual-image incorporation unit 135 incorporates, into the virtual space, the performance information and the virtual data image in association with each other (step S405). The process is then terminated.

A Series of Steps Performed by Operation Terminal

Figure 15A:
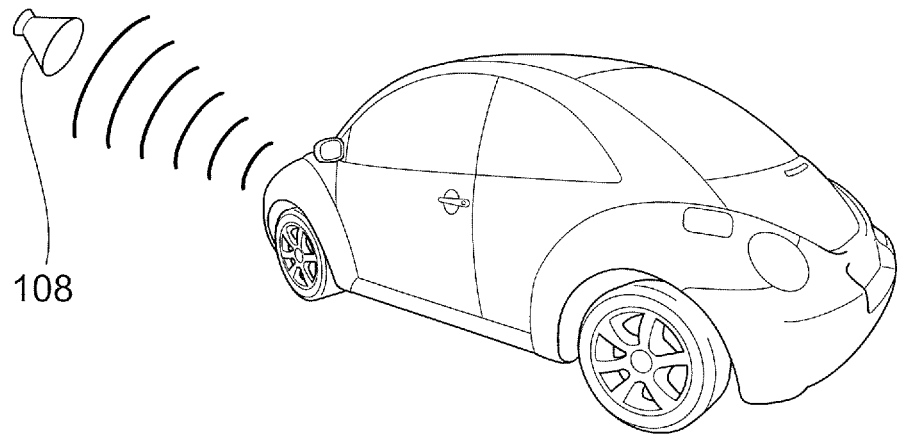
FIGS. 15A and 15B are diagrams for explaining an example of a series of steps performed by the operation terminal according to Exemplary Embodiment 3.
Figure 15B:
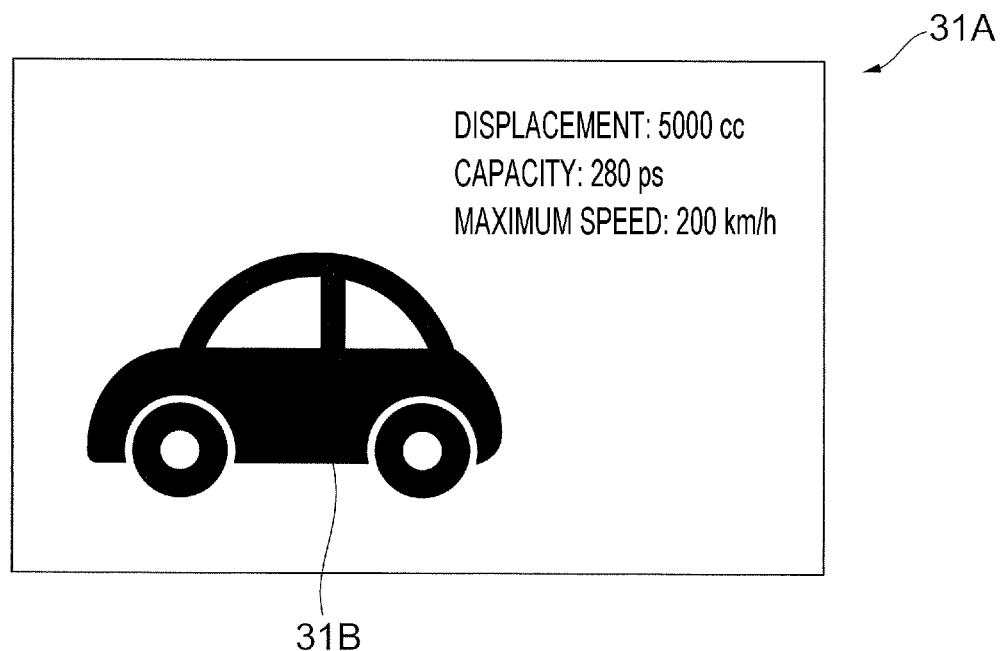

A series of steps performed by the operation terminal 100 according to this exemplary embodiment will be described. FIGS. 15A and 15B are diagrams for explaining an example of the series of steps performed by the operation terminal 100 according to Exemplary Embodiment 3. A case where a racing game is played in virtual space will be described as an example.

FIG. 15A is a diagram for explaining an example of a sound acquired by the sound detection unit 108. For example, the user actually runs the engine of an automobile, and the sound detection unit 108 detects an engine sound. As the result, the sound collection unit 131 collects the sound detected by the sound detection unit 108.

After the sound collection unit 131 collects the engine sound, the object identification unit 132 judges where the collected engine sound has an attribute of a predetermined object on the basis of the information stored in the virtual-image storage unit 133. If the collected engine sound is the same (or similar to) as the engine sound of, for example, the automobile from Company A illustrated in FIG. 13, the object identification unit 132 judges that the collected engine sound has the attribute of the automobile from Company A on the basis of pattern matching or the like.

The performance-information acquisition unit 134 acquires, from the external apparatus such as the management server 200 through the network 300, performance information corresponding to the automobile from Company A the attribute of which is judged to be included in the collected engine sound. For example, information indicating a displacement of 5000 cc, a capacity of 280 ps, and a maximum speed of 200 km/h is acquired as the performance information regarding the automobile from Company A. The virtual-image incorporation unit 135 acquires a virtual data image associated with the automobile from Company A from the virtual-image storage unit 133. The virtual-image incorporation unit 135 incorporates, into the racing game, the performance information and the virtual data image in association with each other.

FIG. 15B is a diagram illustrating an example of a data image 31A incorporated into the racing game and then displayed on the display 105. In the example illustrated in FIG. 15B, a virtual data image 31B of the automobile from Company A is displayed on the display 105 as a data image associated with the collected engine sound. The performance information indicates a displacement of 5000 cc, a capacity of 280 ps, and a maximum speed of 200 km/h. The user may use, in the racing game, the automobile from Company A having the performance indicated by the performance information.

In this exemplary embodiment as described above, the operation terminal 100 identifies the attribute of an object from the sound collected by the sound collection unit 131 and incorporates, into the virtual space, a virtual data image and performance information that correspond to the object the attribute of which is identified. The incorporation of the virtual data image and the performance information into the virtual space enables the user to use, in the virtual space, information regarding the object associated with the collected sound.

Note that although the virtual-image incorporation unit 135 acquires the performance information from the external apparatus such as the management server 200 through the network 300 in this exemplary embodiment, the performance information may be included in the virtual-image DB as in Exemplary Embodiment 2. In this case, the virtual-image DB illustrated in FIG. 13 also stores therein pieces of performance information on a per-object-attribute basis, such as for "Automobile from Company A", "Automobile from Company B", and "Automobile from Company C".

Although the sound collection unit 131 collects the sound actually detected by the sound detection unit 108 in this exemplary embodiment, the configuration is not limited to such a configuration. For example, the sound collection unit 131 may collect, as sound data, a sound received from the management server 200 through the network 300 or a sound provided in such a manner as to be stored in a recording medium such as a CD-ROM.

The process performed by each operation terminal 100 according to a corresponding one of Exemplary Embodiments 1 to 3 does not have to be executed by only the operation terminal 100 and may be shared with another apparatus. For example, in Exemplary Embodiment 1, the operation terminal 100 may have the functions of the real-image acquisition unit 111 and the combining unit 116, and the management server 200 may have the functions of the region division unit 112, the region-attribute identification unit 113, the virtual-image storage unit 114, and the virtual-image acquisition unit 115. In this case, for example, the operation terminal 100 acquires a real data image and thereafter transmits the acquired real data image to the management server 200. The management server 200 identifies a virtual data image to be combined with the real data image and transmits the identified virtual data image to the operation terminal 100. This causes the operation terminal 100 to combine the real data image with the virtual data image and thereby generate a composite data image.

Further, note that programs for implementing the exemplary embodiments of the invention may be provided not only through a communication medium but also in such a manner as to be stored in a recording medium such as a CD-ROM.

Note that various exemplary embodiments and modifications described above as Exemplary Embodiments 1 to 3 may be combined. That is, to implement the operation terminal 100, for example, all of or two of Exemplary Embodiments 1 to 3 may be combined together. Alternatively, for example, one of Exemplary Embodiments 1 to 3 may be used to implement the operation terminal 100.

The present disclosure is not limited to the exemplary embodiments described above and may be implemented in various forms without departing from the spirit of the disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   a processor programmed to
      acquire a real image captured in a real space,
      divide the real image into a plurality of regions,
      identify an attribute of each of the plurality of regions,
      select, for image editing, one or more regions of the plurality of regions in accordance with a predetermined rule for selecting, the predetermined rule for selecting being distinct from a predetermined division algorithm by which the real image is divided into the plurality of regions,
      identify one or more prestored virtual images stored in association with the identified attribute of the selected one or more regions, the one or more identified prestored virtual images being images of objects different than the selected one or more regions, wherein the predetermined rule for selecting is unrelated to the identifying of the one or more prestored virtual images, and
      combine the one or more prestored virtual images with the acquired real image such that the one or more prestored virtual images are fixed in the selected one or more regions, without replacing the selected one or more regions, to thereby generate a composite image.

2. The information processing system according to claim 1, further comprising:
   a display that displays the composite image.

3. The information processing system according to claim 1, further comprising:
   a memory that stores an association between the prestored virtual images and the attributes of the plurality of regions.

4. The information processing system according to claim 2, further comprising:
   a memory that stores an association between the prestored virtual images and the attributes of the plurality of regions.

5. An information processing system comprising:
   a processor programmed to
      identify a virtual image corresponding to an object that is present in a real space, the identified virtual image and the object that is present in the real space being the same type of object, the virtual image being identified based on a sound emitted from the object, the processor storing a database in which a plurality of the virtual images are associated with a plurality of the objects to which the virtual images correspond respectively, and in which a plurality of the sounds are associated with the plurality of the objects to which the sounds correspond respectively, wherein the database stores the plurality of the sounds associated with the plurality of the objects prior to the sound being emitted by the object, acquire performance information indicating performance of the object, and incorporate, into a virtual space, the acquired performance information and the virtual image corresponding to the object in association with each other.

6. An information processing system comprising:

a processor programmed to acquire a real image captured in a real space, acquire a predetermined virtual image from a virtual image database, identify a region in the acquired real image where the predetermined virtual image is to be combined with the acquired real image, the region being identified based on an attribute of the predetermined virtual image, wherein the predetermined virtual image is acquired in accordance with a predetermined rule, the predetermined rule being unrelated to the acquired real image, and combine the predetermined virtual image with the acquired real image such that the predetermined virtual image is fixed in the identified region, to thereby generate a composite image.

7. The information processing system according to claim 6, wherein the processor is further programmed to determine whether the acquired real image contains any region corresponding to the attribute of the predetermined virtual image, and in response to a determination that the acquired real image contains no region corresponding to the attribute, the processor does not generate a composite image using the predetermined virtual image and the acquired real image.

* * * * *